(12) United States Patent
Yeum

(10) Patent No.: US 8,592,714 B2
(45) Date of Patent: Nov. 26, 2013

(54) GRIPPER DEVICE FOR LASER WELDING AND VISION INSPECTION

(75) Inventor: Jung Whan Yeum, Seoul (KR)

(73) Assignee: Hyundai Motor Company, Seoul (KR)

( * ) Notice: Subject to any disclaimer, the term of this patent is extended or adjusted under 35 U.S.C. 154(b) by 331 days.

(21) Appl. No.: 13/170,546

(22) Filed: Jun. 28, 2011

(65) Prior Publication Data
US 2012/0145682 A1 Jun. 14, 2012

(30) Foreign Application Priority Data
Dec. 8, 2010 (KR) .......................... 10-2010-0124899

(51) Int. Cl.
*B23K 26/32* (2006.01)
*G05B 19/19* (2006.01)

(52) U.S. Cl.
USPC ................ 219/121.62; 219/121.63; 294/902; 269/905; 700/166; 700/259

(58) Field of Classification Search
USPC .......... 219/121.62, 121.63, 121.83; 294/81.2, 294/81.4, 81.6, 197, 902; 269/45, 905; 29/281.1; 700/166, 247, 259
See application file for complete search history.

(56) References Cited

U.S. PATENT DOCUMENTS

| 4,488,032 | A | * | 12/1984 | Case et al. | 219/124.34 |
| 5,229,571 | A | * | 7/1993 | Neiheisel | 219/121.63 |
| 5,554,837 | A | * | 9/1996 | Goodwater et al. | 219/121.63 |
| 6,403,916 | B1 | * | 6/2002 | Spooner et al. | 219/121.63 |
| 6,664,499 | B1 | * | 12/2003 | Brink et al. | 219/121.67 |
| 7,855,350 | B2 | * | 12/2010 | Schurmann et al. | 219/121.63 |
| 8,485,575 | B2 | * | 7/2013 | Yeum | 294/81.6 |

* cited by examiner

*Primary Examiner* — Samuel M Heinrich
(74) *Attorney, Agent, or Firm* — Edwards Wildman Palmer LLP; Peter F. Corless

(57) ABSTRACT

A gripper device for laser welding and vision inspection is provided which includes a frame unit releasably mounted on a front end of an arm of a robot and a clamping unit mounted on the frame unit. Additionally, embodied in this single gripper device is a laser-vision exchange (first) module, a laser-vision sharing (second) module and a laser-vision target (third) module all embodied in a single gripper device to irradiate laser beam for welding a welding object and obtain a vision source of an inspection object.

14 Claims, 10 Drawing Sheets (S1)

(S2)

GRIPPER DEVICE FOR LASER WELDING AND VISION INSPECTION

CROSS-REFERENCE TO RELATED APPLICATION

This application claims priority to and the benefit of Korean Patent Application No. 10-2010-0124899 filed in the Korean Intellectual Property Office on Dec. 8, 2010, the entire contents of which are incorporated herein by reference.

BACKGROUND OF THE INVENTION (a) Field of the Invention The present invention relates to a gripper device. More particularly, the present invention relates to a gripper device that can clamp, transfer, laser-weld, and inspect components of a vehicle body.

(b) Description of the Related Art

Generally, a gripper is used for transferring components of a vehicle body from one process to another process in a vehicle body assemble line. The gripper is mounted at a front end of an arm of a robot and is thus often referred to by those skilled in the art as a robot gripper. In addition, various components of the vehicle body are welded by a welding robot in the vehicle body assemble line often through the use of laser welding techniques. Laser welding is a welding technique that uses a laser beam to join pieces of material together. The beam provides a concentrated heat source, allowing for narrow, deep welds and high welding rates. Laser welding is beneficial because a laser beam can be transmitted through air rather than requiring a vacuum, the process is easily automated with robotic mechanisms, x-rays need not be generated in the process, and laser beam welding results in higher quality welds.

In operation, the size of a laser beam oscillated by a laser oscillator is changed and the laser beam is irradiated to a welding portion of a welding object thereby welding the welding portion of the welding object.

Along the assembly line, the welding state of the vehicle body components and distribution of holes are inspected in the vehicle body assemble line. The inspection processes are performed by using images of the vehicle body components obtained by a vision camera.

According to conventional designs, transfer, laser welding, and vision inspection of the vehicle body components are performed by separate respective devices. Therefore, working processes and equipments as a result are often complex, and thus working time may increase, and initial investment may be raised.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a gripper device for laser welding and vision inspection having advantages that clamping, transfer, laser welding, and vision inspection of vehicle body components are performed by one device.

A gripper device for laser welding and vision inspection according to an exemplary embodiment of the present invention may include: a frame unit releasably mounted at a front end of an arm of a robot; a clamping unit mounted at the frame unit and configured to clamp an object; a laser-vision exchange module (first module) having a laser irradiator irradiating a laser beam for welding a welding object and a vision camera portion obtaining a vision source of an inspection object, and mounted at the frame unit; a laser-vision sharing module (second module) mounted at the frame unit corresponding to the laser-vision exchange module, determining a direction of the laser beam irradiated by the laser irradiator, and delivering the vision source of the inspection object to the vision camera portion; and a laser-vision target module (third module) mounted at the frame unit, delivering the laser beam reflected by the laser-vision sharing module to the welding object, and delivering the vision source of the inspection object to the laser-vision sharing module.

The laser-vision exchange module may perform irradiating the laser beam by the laser irradiator and obtaining the vision source by the vision camera portion selectively. In addition, the frame unit may further include a plurality of branch frames extending from a center thereof in predetermined directions, wherein the clamping unit is disposed at each branch frame.

The gripper device may further include a laser-vision passage formed at a middle portion of frame unit so that the laser beam and the vision source passing through the laser-vision passage. The laser-vision exchange module and the laser-vision sharing module may be fixedly mounted on the frame unit through a fixing bracket with the laser-vision passage being disposed therebetween.

The laser-vision exchange module may include: a main body at which the laser irradiator and the vision camera portion are mounted; and a vision reflecting mirror mounted on the main body to reflect the vision source of the inspection object delivered from the laser-vision sharing module to the vision camera portion. The vision reflecting mirror may also be movable in the laser irradiating passage without interference with the laser beam.

The main body may include: a laser irradiating passage through which the laser beam irradiated by the laser irradiator passes; and a vision delivering passage through which the vision source of the inspection object obtained by the laser-vision sharing module is delivered to the vision camera portion. A first operating cylinder connected to the vision reflecting mirror and moving the vision reflecting mirror with respect to the laser irradiating passage may also be mounted on the main body.

The laser-vision sharing module may include: a guide member formed of a guide rail branched out radially; a moving block mounted at the guide member and configured to move along the guide rail; a division mirror fixedly mounted at the moving block and reflecting at least one of the laser beam and the vision source in at least one direction; an electromagnet movably mounted at the guide rail, generating magnetic force by receiving electricity, configured to be coupled with the moving block; and a second operating cylinder connected to the electromagnet and moving the electromagnet to which the electricity is applied through the guide rail.

The division mirror may have a reflecting surface facing the laser-vision target module. The division mirror may deliver the laser beam irradiated through the laser irradiator to the laser-vision target module and may deliver the vision source of the inspection object reflected through the laser-vision target module to the vision camera portion.

The laser-vision target module may even further include: a target reflecting mirror rotatably mounted at the branch frame through a supporting member; and a drive motor mounted at the supporting member and rotating the target reflecting mirror.

BRIEF DESCRIPTION OF THE DRAWINGS

The drawings illustrate exemplary embodiments of the present invention and are not construed to limit any aspect of the invention.

DESCRIPTION OF SYMBOLS

Figure 1:
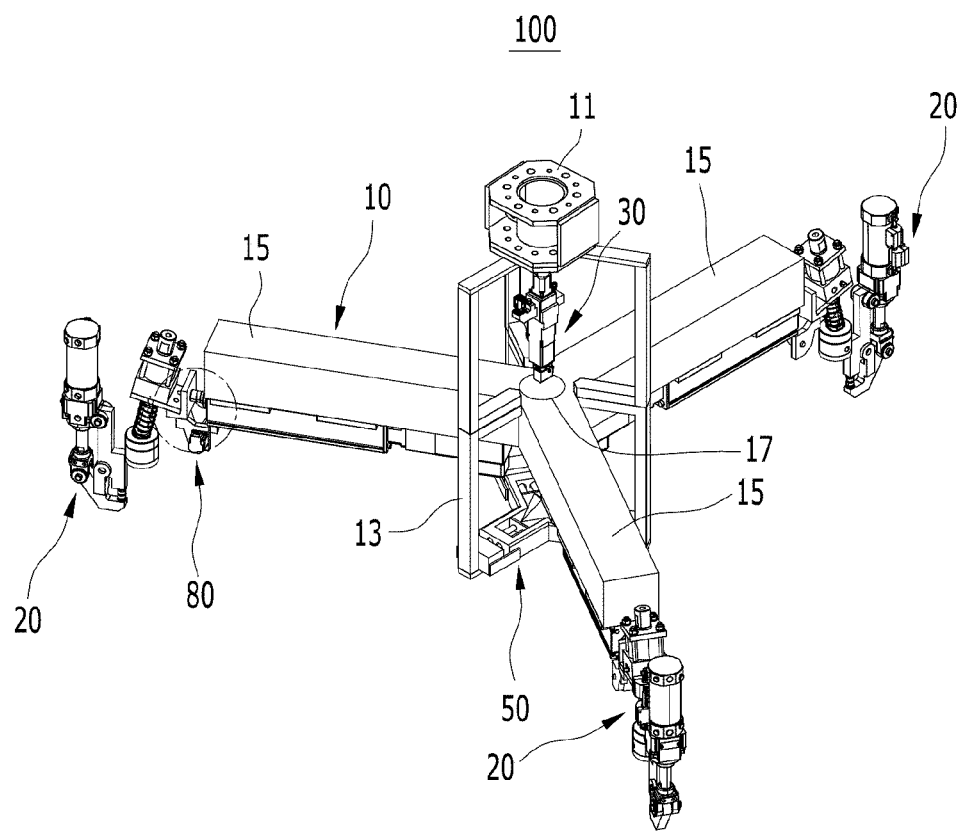
FIG. 1 is a perspective view of a gripper device for laser welding and vision inspection according to an exemplary embodiment of the present invention.

10: frame unit
11: tool mounting portion
13: fixing bracket
15: branch frame
17: laser-vision passage
20: clamping unit
30: laser-vision exchange module
31: laser irradiator
33: vision camera portion
35: main body
37: vision reflecting mirror
41: laser irradiating passage
42: vision delivering passage
44: first operating cylinder
45, 65: operating rod
50: laser-vision sharing module
51: guide member
52: guide rail
54: moving block
57: division mirror
58: reflecting surface
61: electromagnet
64: second operating cylinder
80: laser-vision target module
81: target reflecting mirror
83: drive motor
85: supporting member
87: rotating shaft
89: mounting bracket
LB: laser beam
VS: vision source

DETAILED DESCRIPTION OF THE EMBODIMENTS

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Description of components that are not necessary for explaining the present invention will be omitted, and the same constituent elements are denoted by the same reference numerals in this specification.

In addition, size and thickness of components shown in the drawings may be different from the real size and real thickness of the components for better comprehension and ease of description. Therefore, the present invention is not limited to those shown in the drawings.

Note that it is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

FIG. 1 is a perspective view of a gripper device for laser welding and vision inspection according to an exemplary embodiment of the present invention. Referring to the drawing, a gripper device 100 for laser welding and vision inspection according to an exemplary embodiment of the present invention can be applied to a vehicle body assemble line in which transfer, inspection, and welding of vehicle body components are performed.

The gripper device 100 transfers the vehicle body components from one process to another process, laser-welds an object to be welded (hereinafter, it is called "welding object"), and vision-inspects position/distribution of an object to be inspected (hereinafter, it is called "inspection object") in the vehicle body assemble line. That is, the gripper device 100 clamps and transfers the vehicle body components, welds the welding object by changing size and irradiating direction of a laser beam, and vision-inspects the inspection object by obtaining vision source of the inspection object.

The gripper device 100 according to the present exemplary embodiment differs from conventional arts that perform laser welding and vision inspection by using multiple devices, by being able to perform both laser welding and vision inspection using one optical instrument and one device.

For this purpose, the gripper device 100 for laser welding and vision inspection according to an exemplary embodiment of the present invention includes a frame unit 10, a clamping unit 20, a laser-vision exchange module 30, a laser-vision sharing module 50, and a laser-vision target module 80. Each component will be described in detail below.

According to the present exemplary embodiment, the frame unit 10 which includes various blocks, protrusions, plates, and brackets, and such components will be called the frame unit 10, unless otherwise described herein.

The frame unit 10 is mounted at a front end of an arm of a robot (not shown). The frame unit 10 is provided with a tool mounting portion 11 mounted on a tool changer (not shown) of the robot. Herein, the tool mounting portion 11 is fixed to the frame unit 10 through an additional fixing bracket 13, and various constituent elements are mounted at the fixing bracket 13 respectively.

A plurality of branch frames 15 are integrally formed with the frame unit 10. The branch frames are extended from a center of the frame unit 10 toward predetermined directions. For example, an angle between the branch frames 15 may be about 120 degree when three branch frames 15 are used. Herein, a circular laser-vision passage 17 through which the laser beam and the vision source pass is formed at a center portion of the frame unit 10 where the branch frames 15 are connected.

According to the present exemplary embodiment, the clamping unit 20 is configured to clamp an object such as the vehicle body components, and is mounted at each branch frame 15 of the frame unit 10. In one or some embodiments, the clamping unit 20 is mounted at an end portion of each branch frame 15, and includes a clamper, a locator, and an operating cylinder that are used for defining a clamping point of the vehicle body components. A well-known clamping device that is widely used in the vehicle body assemble line is used as the clamping unit 20, and thus a detailed description thereof will be omitted in this specification.

According to the present exemplary embodiment, the laser-vision exchange module 30 can selectively perform laser welding of the welding object by means of the laser beam and vision inspection of the inspection object through obtaining the vision source of the inspection object. The laser-vision exchange module 30 is disposed above the laser-vision passage 17 of the frame unit 10 and is fixedly mounted at the fixing bracket 13.

Figure 2:
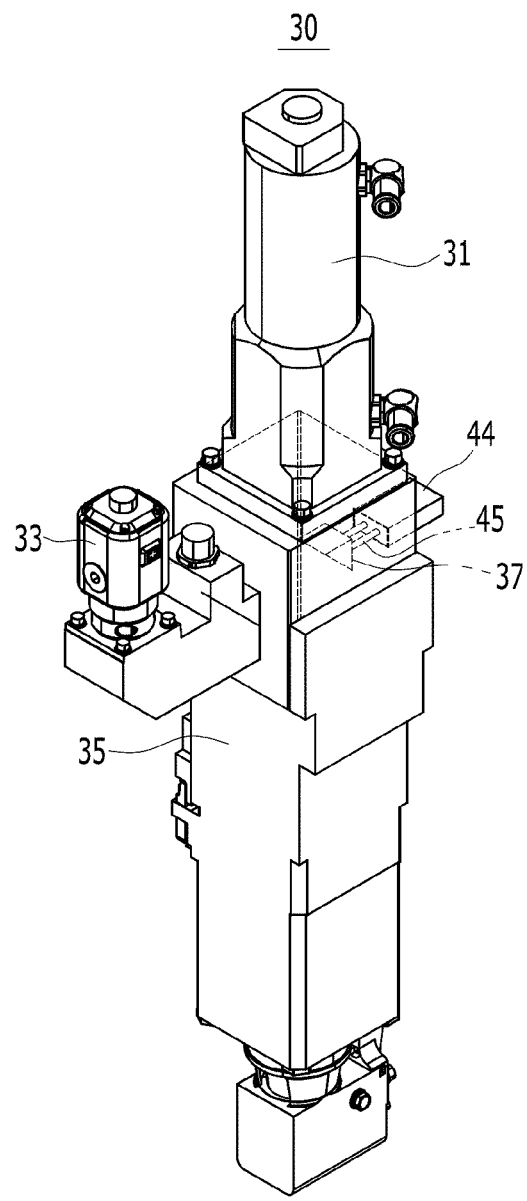
FIG. 2 is a perspective view of a laser-vision exchange module applied to a gripper device for laser welding and vision inspection according to an exemplary embodiment of the present invention.
Figure 3:
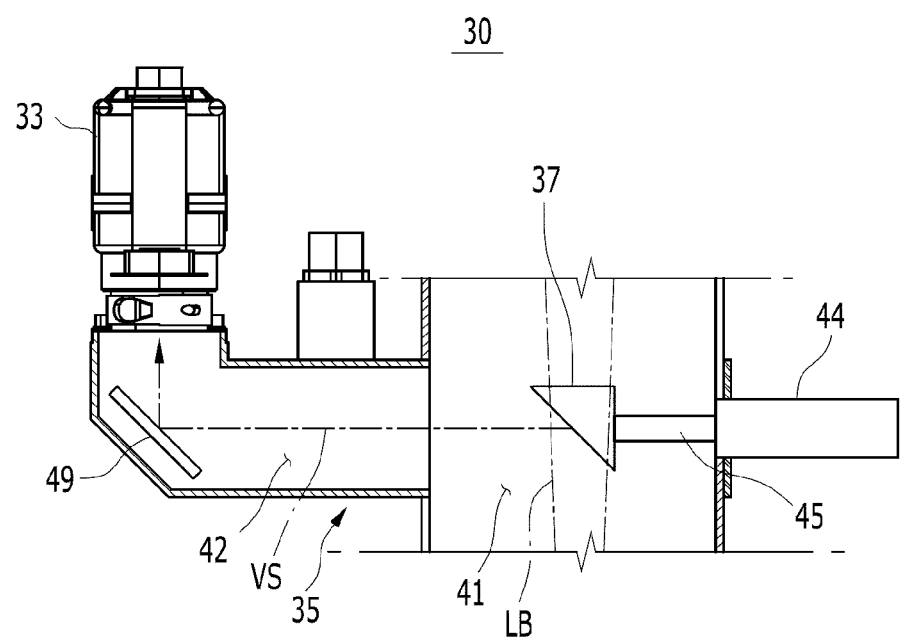
FIG. 3 is a partial cross-sectional view of FIG. 2.

FIG. 2 is a perspective view of a laser-vision exchange module which may be applied to a gripper device for laser welding and vision inspection according to an exemplary embodiment of the present invention and FIG. 3 is a partial cross-sectional view of FIG. 2. Referring to the drawings, the laser-vision exchange module 30 according to the present exemplary embodiment includes a laser irradiator 31 that irradiates the laser beam so as to weld the welding object and a vision camera portion 33 that obtains the vision source of the inspection object. That is, the laser-vision exchange module 30 selectively irradiates the laser beam by the laser irradiator 31 and obtains the vision source by the vision camera portion 33 by utilizing a single laser-vision exchange module 30.

The laser irradiator 31 changes the size of the laser beam oscillated by a laser oscillator (not shown) through a mirror and irradiates the laser beam accordingly. In addition, the vision camera portion 33 photographs the vision source that may be an image of the inspection object. The photograph is then used for inspecting position/distribution of the inspection object based on the current position/distribution of the vision source. The laser irradiator 31 and the vision camera portion 33 may be any well-known and widely used laser irradiating system and vision camera system, and thus a detailed description thereof will be omitted in this specification.

The laser-vision exchange module 30 includes a main body 35 to which the laser irradiator 31 and the vision camera portion 33 are integrally mounted and a vision reflecting mirror 37 mounted on the main body 35. The main body 35 is fixed to the fixing bracket 13, is provided with the laser irradiator 31 on an upper portion thereof, and is provided with the vision camera portion 33 on a surface thereof.

In addition, the main body 35 is formed of a laser irradiating passage 41 for passing the laser beam LB irradiated by the laser irradiator 31 and a vision delivering passage 42 for delivering the vision source VS of the inspection object to the vision camera portion 33. In this case, the laser irradiating passage 41 is formed vertically corresponding to the laser irradiator 31, and the vision delivering passage 42 is connected to the laser irradiating passage 41 and is formed toward one surface of the main body 35.

The vision reflecting mirror 37 delivers the vision source of the inspection object obtained by the laser-vision sharing module 50 to the vision camera portion 33. The vision reflecting mirror 37 is mounted on the main body 35 without interference with the laser beam LB in the laser irradiating passage 41, and is configured to move forward or rearward in a direction of the vision delivering passage 42. That is, the vision reflecting mirror 37 moves rearward in the laser irradiating passage 41 so as not to hinder a movement of the laser beam LB when laser welding the welding object. In addition, the vision reflecting mirror 37 moves forward to a moving path of the laser beam LB when vision-inspecting the inspection object and is configured to deliver the vision source to the vision camera portion 33 through the vision delivering passage 42.

For this purpose, a first operating cylinder 44 is mounted at the main body 35. The first operating cylinder 44 is configured to move the vision reflecting mirror 37 forward or rearward in the direction of the vision delivering passage 42.

In one or more embodiments, the first operating cylinder 44 may be a pneumatic cylinder, but is not limited to this. The first operating cylinder 44 is mounted on another surface of the main body 35, e.g., a different surface of the main body, and is connected to the vision reflecting mirror 37 through an operating rod 45. A non-described reference number 49 in FIG. 3 represents a sub-mirror mounted at the vision delivering passage 42 and reflecting the vision source.

Referring to FIG. 1, the laser-vision sharing module 50 according to the present exemplary embodiment determines a direction of the laser beam irradiated by the laser irradiator 31 of the laser-vision exchange module 30, and delivers the vision source of the inspection object to the vision camera portion 33. The laser-vision sharing module 50 is disposed under the laser-vision passage 17 of the frame unit 10 corresponding to the laser-vision exchange module 30 and is fixedly mounted at the fixing bracket 13. That is, the laser-vision exchange module 30 and the laser-vision sharing module 50 are fixedly mounted at the frame unit 10 through the fixing bracket 13 with the laser-vision passage 17 of the frame unit 10 being disposed therebetween.

Figure 4:
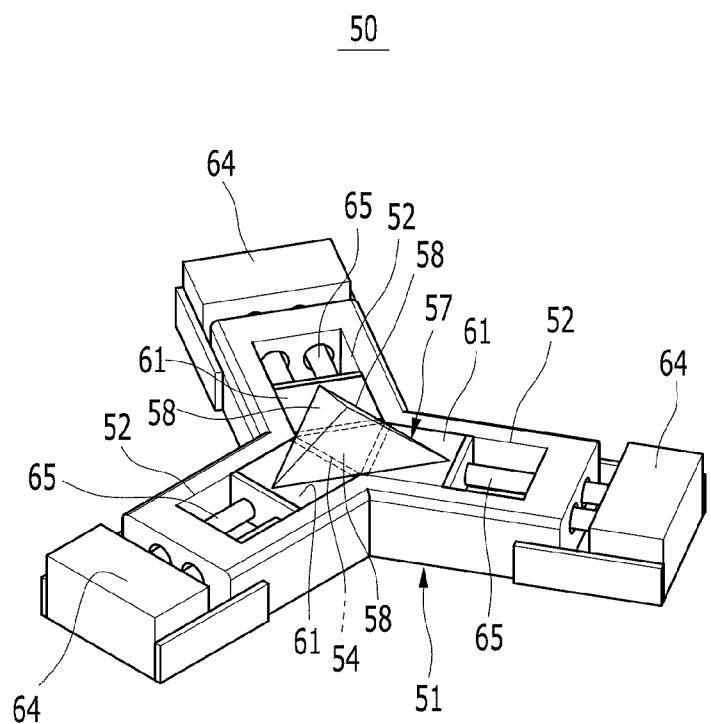
FIG. 4 is a perspective view of a laser-vision sharing module applied to a gripper device for laser welding and vision inspection according to an exemplary embodiment of the present invention.

FIG. 4 is a perspective view of a laser-vision sharing module applied to a gripper device for laser welding and vision inspection according to an exemplary embodiment of the present invention. Referring to the drawing, the laser-vision sharing module 50 according to the present exemplary embodiment includes a guide member 51, a moving block 54, a division mirror 57, an electromagnet 61, and a second operating cylinder 64.

The guide member 51 is disposed under the frame unit 10 and is fixedly mounted at the fixing bracket 13. The guide member 51 is formed of a plurality of guide rails 52 which are extended from a center thereof in predetermined directions. In one or more embodiments, three guide rails 52 are branched out radially and are positioned respectively at three sections divided by the branch frames 15 of the frame unit 10.

That is, the guide rails 52 of the guide member 51 are positioned between the branch frames 15.

The moving block 54 is mounted at a center portion of the guide member 51 and is configured to move along each guide rail 52. In one or some embodiments, the moving block 54 is made of metal materials and has triangular block shape.

The division mirror 57 delivers the laser beam irradiated from the laser irradiator 31 to the laser-vision target module 80 and delivers the vision source obtained by the laser-vision target module 80 to the vision camera portion 33. The division mirror 57 reflects the laser beam and the vision source in various directions. In one or more embodiments, the division mirror 57 may have a pyramid shape having three reflecting surfaces 58 facing the laser-vision target module 80 and is fixedly mounted at the moving block 54.

The electromagnet 61 is movably mounted at each guide rail 52 of the guide member 51 corresponding to the moving block 54. The electromagnet 61 generates magnetic force by receiving electricity and is selectively coupled to the moving block 54. In addition, the second operating cylinder 64 is mounted near the guide rail 52 of the guide member 51 and is connected to the electromagnet 61 through the operating rod 65.

In one or more embodiments, the second operating cylinder 64 may be a pneumatic cylinder and moves the corresponding electromagnet 61, that is the electromagnet 61 generating the magnetic force and coupled to the moving block 54 forward or rearward along the guide rail 52.

Referring back to FIG. 1, the laser-vision target module 80 delivers the laser beam reflected by the laser-vision sharing module 50 to the welding object, and delivers the vision source of the inspection object to the laser-vision sharing module 50. In one or more embodiments, a plurality of laser-vision target modules 80 are mounted on the frame unit 10, especially an end portion of each branch frame 15.

Figure 5:
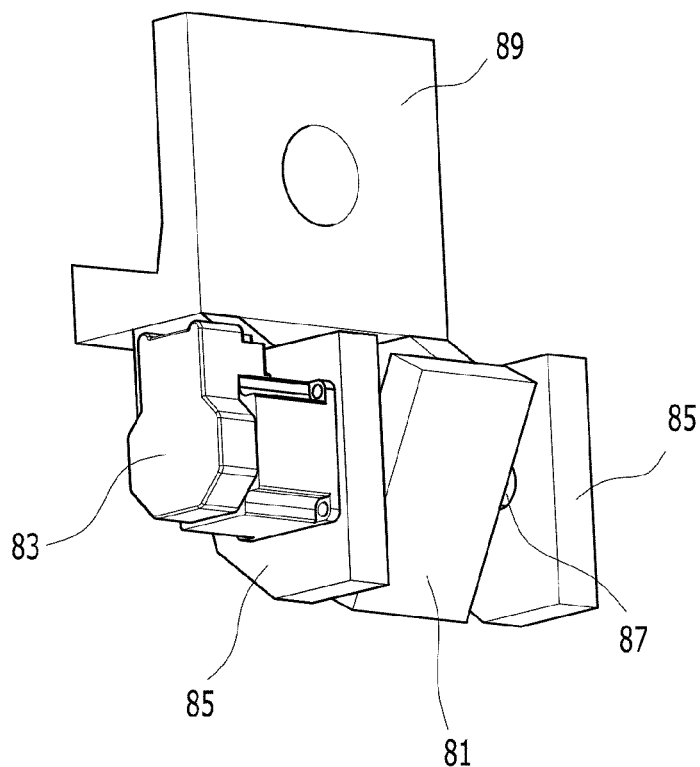
FIG. 5 is a perspective view of a laser-vision target module applied to a gripper device for laser welding and vision inspection according to an exemplary embodiment of the present invention.

FIG. 5 is a perspective view of a laser-vision target module applied to a gripper device for laser welding and vision inspection according to an exemplary embodiment of the present invention. Referring to the drawing, the laser-vision target module 80 according to the present exemplary embodiment is mounted at the end portion of each branch frame 15 through the mounting bracket 89, and includes a target reflecting mirror 81 and a drive motor 83.

The target reflecting mirror 81 is rotatably mounted through a pair of supporting members 85 provided at each branch frame 15. The target reflecting mirror 81 is fixed to a rotating shaft 87 rotatably mounted between the supporting members 85. In addition, the drive motor 83 applies torque to the rotating shaft 87. In one or more embodiments, the drive motor 83 may be a step motor.

Hereinafter, an operation of the gripper device 100 for laser welding and vision inspection according to an exemplary embodiment of the present invention will be described in detail with reference to the accompanying drawings.

FIG. 6 is a schematic diagram for explaining operation of a gripper device for laser welding and vision inspection according to an exemplary embodiment of the present invention. When laser-welding the welding object, a position of the laser beam irradiated to the welding object is determined by the laser-vision exchange module 30, the laser-vision sharing module 50, and the laser-vision target module 80. For this purpose, the vision reflecting mirror 37 is moved rearward (depicted as a solid line arrow in the drawing) by the first operating cylinder 44 according to the present exemplary embodiment as shown in FIG. 6A.

Figure 6A:
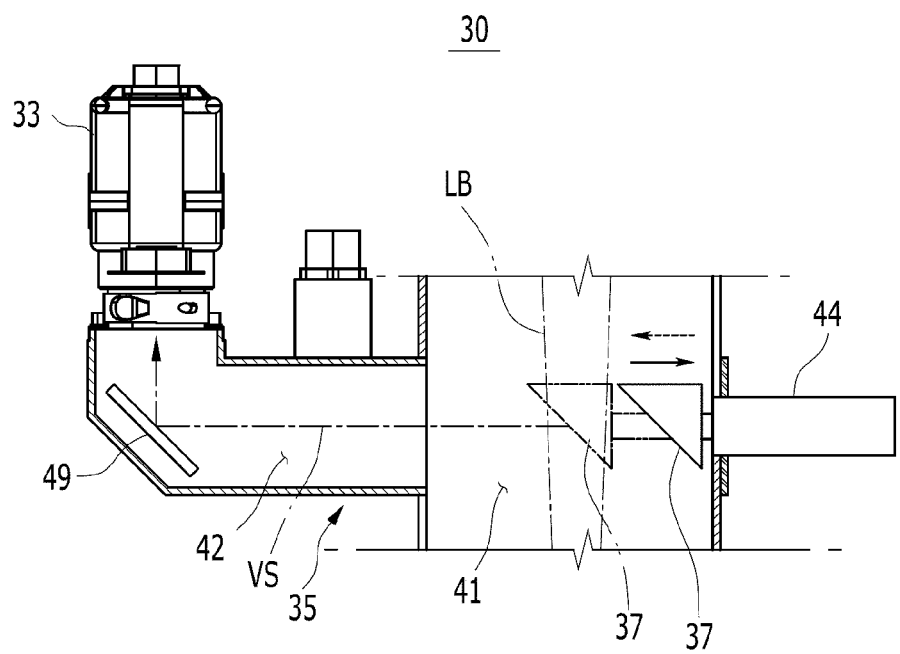
FIG. 6 is a schematic diagram for explaining operation of a gripper device for laser welding and vision inspection according to an exemplary embodiment of the present invention.
Figure 6B:
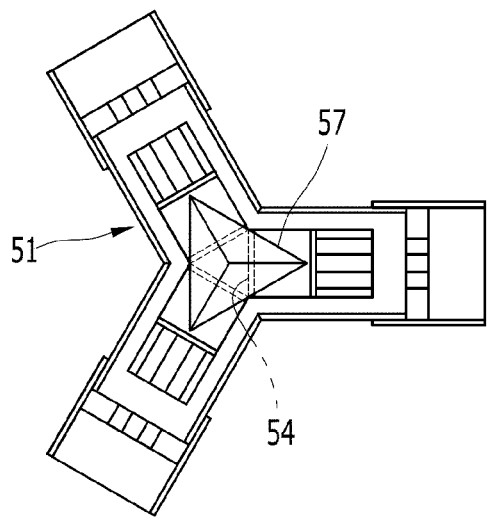
Figure 6B:
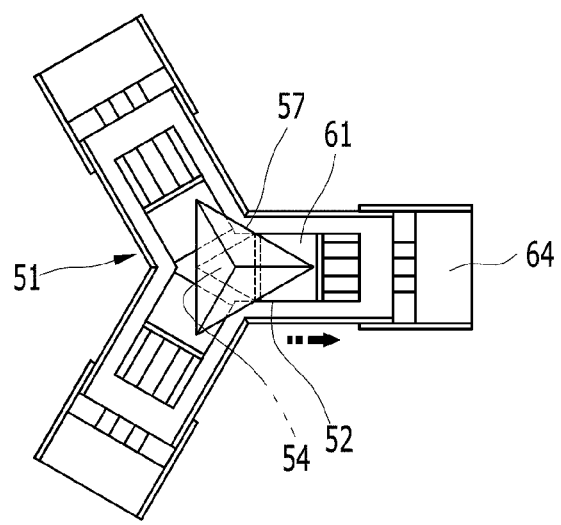

After that, the moving block 54 of the laser-vision sharing module 50 and the division mirror 57 are positioned at a center of the guide member 51 such as S1 in FIG. 6B, and the electricity is applied to the electromagnet 61 such as S2 in FIG. 6B. At this time, the moving block 54 is attached to the electromagnet 61 to which the electricity is applied. During this state, if the second operating cylinder 64 to which the corresponding electromagnet 61 is connected is operated, the moving block 54 moves rearward (depicted as bold arrow in the drawing) along the guide rail 52 of the guide member 51.

Figure 6C:
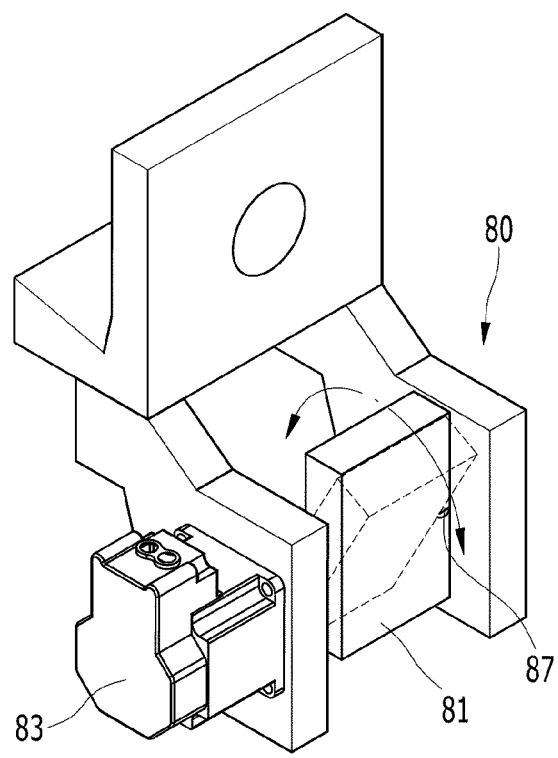

As the moving block 54 moves rearward by the second operating cylinder 64, the division mirror 57 moves rearward, as well. During the above-mentioned processes, the target reflecting mirror 81 of the laser-vision target module 80 is rotated so as to correspond to a welding position of the welding object as shown in FIG. 6C. Herein, the target reflecting mirror 81 can rotate with respect to the rotating shaft 87 to both directions by the operation of the drive motor 83.

Figure 7:
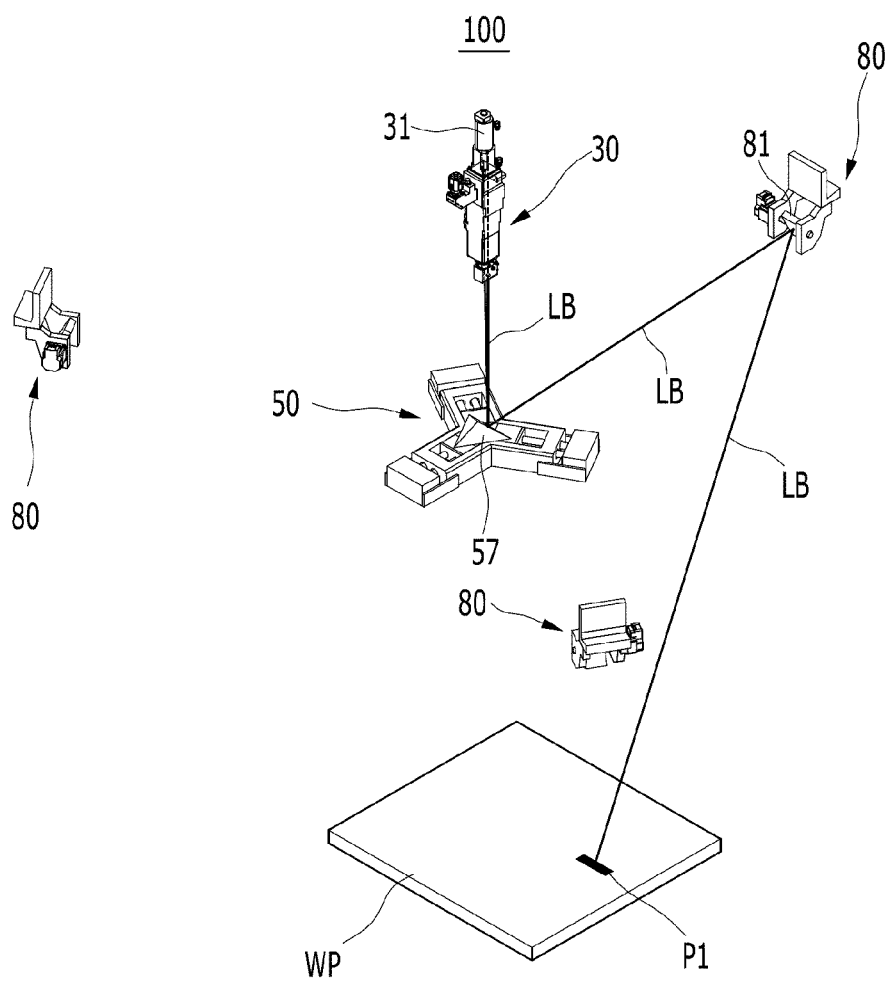
FIG. 7 is a schematic diagram for explaining a laser welding mode by using a gripper device for laser welding and vision inspection according to an exemplary embodiment of the present invention.

If the position of the laser beam irradiated to the welding object is determined, the laser beam LB is irradiated through the laser irradiator 31 of the laser-vision exchange module 30 as shown in FIG. 7. Then, the laser beam LB is input into the division mirror 57 of the laser-vision sharing module 50 through the laser irradiating passage 41 of the main body 35 and is reflected by the division mirror 57 so as to be delivered to the target reflecting mirror 81 of the laser-vision target module 80. After that, the laser beam LB is reflected by the target reflecting mirror 81 and is irradiated to the welding point P1 of the welding object WP. Thereby, the welding point P1 is welded.

It is exemplarily shown in the drawing that an irradiation of the laser beam LB to the welding object WP is done by one of the three laser-vision target modules 80, but the irradiation of the laser beam LB is not limited to this. That is, the laser beam LB can be irradiated through all or some laser-vision target modules 80 as well.

Meanwhile, the vision source of the vehicle body components can be obtained and the inspection object can be vision-inspected by using the gripper device 100 according to the present exemplary embodiment. In this case, the vision source of the inspection object can be obtained through the laser-vision exchange module 30, the laser-vision sharing module 50, and the laser-vision target module 80. For this purpose, the vision reflecting mirror 37 is moved forward (depicted as a dotted line arrow in the drawing) to a moving path of the laser LB by the first operating cylinder 44 as shown in FIG. 6A.

In addition, an obtaining position of the vision source of the inspection object is determined through the laser-vision sharing module 50 and the laser-vision target module 80. As described above referring to FIG. 6B and FIG. 6C, these processes will be omitted.

Figure 8:
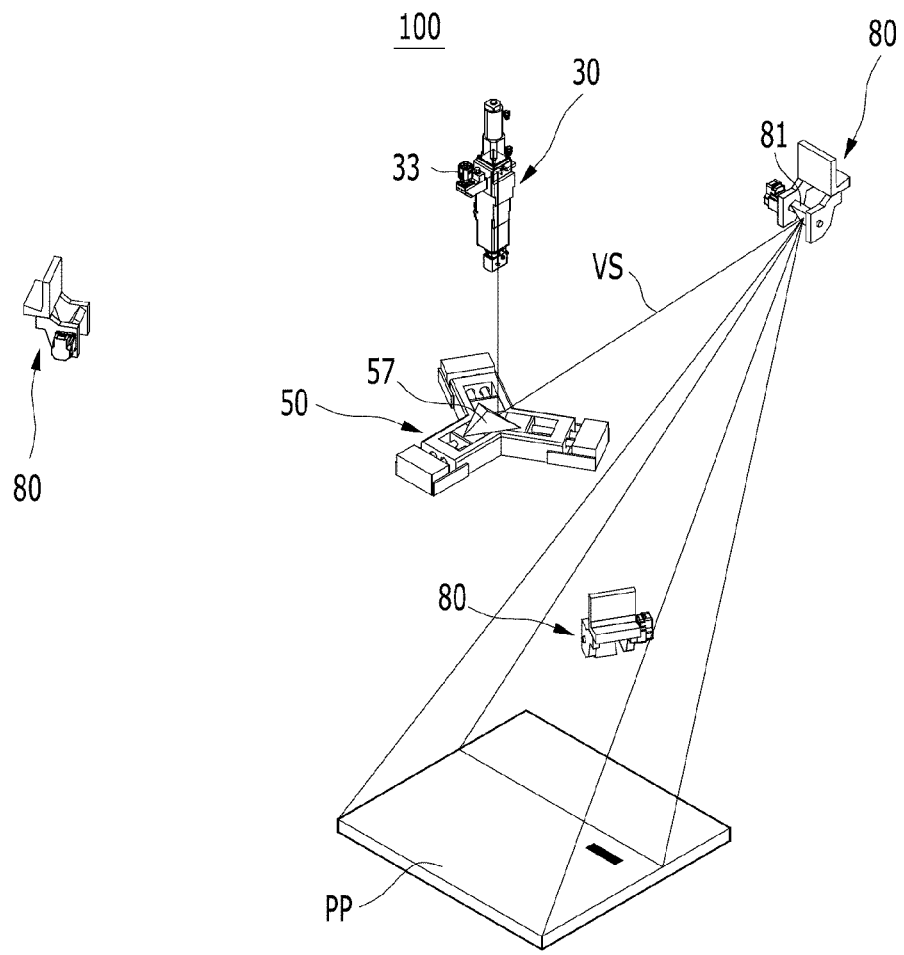
FIG. 8 is a schematic diagram for explaining a vision inspection mode by using a gripper device for laser welding and vision inspection according to an exemplary embodiment of the present invention.

If the obtaining position of the vision source of the inspection object is determined, the vision source VS of the inspection object PP such as the vehicle body components is input into the target reflecting mirror 81 of the laser-vision target module 80, and is reflected by the target reflecting mirror 81 so as to be delivered to the division mirror 57 of the laser-vision sharing module 50 as shown in FIG. 8. The vision source VS is reflected by the division mirror 57 and is input to the vision reflecting mirror 37 of the laser-vision exchange module 30. The vision source VS is reflected by the vision reflecting mirror 37 and is delivered to the vision camera portion 33 through the vision delivering passage 42.

Therefore, the vision camera portion 33 photographs the vision source VS of the inspection object PP and delivers the vision source VS to a controller (not shown). Then, the controller analyzes the vision source VS and inspects the position/distribution of the inspection object PP and welding quality.

It is exemplarily shown in the drawing that obtaining the vision source VS of the inspection object PP is done by one of three laser-vision target module 80, but the obtaining the vision source VS is not limited to this. That is, the vision source VS can be obtained through all or some laser-vision target modules 80.

Further, in one or more embodiments, the vision sources VS obtained by the vision camera portion 33 through three laser-vision target modules 80 are combined and the position/distribution of the inspection object PP and the welding quality are inspected through stereo-vision type systems.

As described above, the vehicle body components are clamped and transferred in the vehicle body assembly line by the clamping unit 20, and the laser welding and the vision inspection of the vehicle body components can be performed by one device according to the gripper device 100 for laser welding and vision inspection in an exemplary embodiment of the present invention.

Advantageously, since transfer, laser welding, and vision inspection of the vehicle body components can be done by one device according to the present exemplary embodiment, vehicle body assemble line may be simplified and initial investments may be reduced. In addition, since irradiating paths of a laser beam to a welding object can be set by using one optical instrument without moving a robot according to the present exemplary embodiment, laser welding speed may be improved. Even further, since the vision sources of the inspection object are combined and the position/distribution of the inspection object are inspected by using the one optical instrument according to the present exemplary embodiment, the inspection object such as the vehicle body components may be precisely inspected.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A gripper device for laser welding and vision inspection, comprising:
   a frame unit releasably mounted on a front end of an arm of a robot;
   a clamping unit mounted on the frame unit and configured to clamp an object;
   a laser-vision exchange module mounted on the frame unit, the laser-vision exchange module having a laser irradiator to irradiate a laser beam for welding a welding object, and a vision camera portion to obtain a vision source of an inspection object;
   a laser-vision sharing module mounted on the frame unit corresponding to the laser-vision exchange module, the laser-vision sharing module to determine a direction of the laser beam irradiated by the laser irradiator, and to deliver the vision source of the inspection object to the vision camera portion; and
   a laser-vision target module mounted at the frame unit, the laser-vision target module delivering the laser beam reflected by the laser-vision sharing module to the welding object, and to deliver the vision source of the inspection object to the laser-vision sharing module.

2. The gripper device of claim 1, wherein the laser-vision exchange module irradiates the laser beam via the laser irradiator and obtains the vision source by the vision camera portion selectively.

3. The gripper device of claim 1, wherein the frame unit comprises a plurality of branch frames extending from a center thereof in predetermined directions, and
   wherein at least one clamping unit is disposed at each branch frame.

4. The gripper device of claim 3, further comprising a laser-vision passage formed at a middle portion of frame unit, the laser beam and the vision source passing through the laser-vision passage.

5. The gripper device of claim 4, wherein the laser-vision exchange module and the laser-vision sharing module are fixedly mounted on the frame unit through a fixing bracket with the laser-vision passage being disposed therebetween.

6. The gripper device of claim 1, wherein the laser-vision exchange module comprises:
   a main body on which the laser irradiator and the vision camera portion are mounted; and
   a vision reflecting mirror mounted on the main body and reflecting the vision source of the inspection object delivered from the laser-vision sharing module to the vision camera portion.

7. The gripper device of claim 6, wherein the main body comprises:
   a laser irradiating passage through which the laser beam irradiated by the laser irradiator passes; and
   a vision delivering passage through which the vision source of the inspection object obtained by the laser-vision sharing module is delivered to the vision camera portion.

8. The gripper device of claim 7, wherein the vision reflecting mirror is mounted on the main body and is movable in the laser irradiating passage without interference with the laser beam.

9. The gripper device of claim 8, wherein a first operating cylinder connected to the vision reflecting mirror and moving the vision reflecting mirror with respect to the laser irradiating passage is mounted on the main body.

10. The gripper device of claim 1, wherein the laser-vision sharing module comprises:
    a guide member formed of a guide rail branched out radially;
    a moving block mounted on the guide member and configured to move along the guide rail;
    a division mirror fixedly mounted at the moving block and reflecting at least one of the laser beam and the vision source in at least one direction;
    an electromagnet movably mounted within the guide rail, the electromagnet generating magnetic force by receiving electricity, and configured to be coupled with the moving block; and
    a second operating cylinder connected to the electromagnet and configured to move the electromagnet to which the electricity is applied through the guide rail.

11. The gripper device of claim 10, wherein the division mirror has a reflecting surface facing the laser-vision target module.

12. The gripper device of claim 11, wherein the division mirror delivers the laser beam irradiated through the laser irradiator to the laser-vision target module and delivers the vision source of the inspection object reflected through the laser-vision target module to the vision camera portion.

13. The gripper device of claim 3, wherein the laser-vision target module comprises:
- a target reflecting mirror rotatably mounted on the branch frame through a supporting member; and
- a drive motor mounted on the supporting member and rotating the target reflecting mirror.

14. A gripper device for laser welding and vision inspection, comprising:
- a frame unit releasably mounted on a front end of an arm of a robot;
- a clamping unit mounted on the frame unit and configured to clamp an object;
- a first module mounted on the frame unit, the first module having a laser irradiator to irradiate a laser beam for welding a welding object, and a vision camera portion to obtain a vision source of an inspection object;
- a second module mounted on the frame unit corresponding to the first module, the second module to determine a direction of the laser beam irradiated by the laser irradiator, and to deliver the vision source of the inspection object to the vision camera portion; and
- a third module mounted at the frame unit, the third module delivering the laser beam reflected by the laser-vision sharing module to the welding object, and to deliver the vision source of the inspection object to the laser-vision sharing module,
- wherein the gripper device is a single unit which embodies the first, second and third modules.

* * * * *